United States Patent
Sung et al.

(10) Patent No.: US 11,906,473 B2
(45) Date of Patent: Feb. 20, 2024

(54) ANTI-BUCKLING JIG FOR FRACTURE TOUGHNESS TEST

(71) Applicant: INDUSTRY-ACADEMIC COOPERATION FOUNDATION GYEONGSANG NATIONAL UNIVERSITY, Jinju-si (KR)

(72) Inventors: Hyo Kyung Sung, Jinju-si (KR); Sang Sik Kim, Jinju-si (KR); Dae Ho Jung, Sacheon-si (KR); Jun Hyuk Park, Gimhae-si (KR); Kwan Ho Lee, Gimcheon-si (KR)

(73) Assignee: INDUSTRY-ACADEMIC COOPERATION FOUNDATION GYEONGSANG NATIONAL UNIVERSITY, Jinju-si (KR)

( * ) Notice: Subject to any disclaimer, the term of this patent is extended or adjusted under 35 U.S.C. 154(b) by 478 days.

(21) Appl. No.: 17/278,569

(22) PCT Filed: Sep. 10, 2019

(86) PCT No.: PCT/KR2019/011682
§ 371 (c)(1),
(2) Date: Mar. 22, 2021

(87) PCT Pub. No.: WO2020/067661
PCT Pub. Date: Apr. 2, 2020

(65) Prior Publication Data
US 2021/0348996 A1    Nov. 11, 2021

(30) Foreign Application Priority Data
Sep. 27, 2018   (KR) .................. 10-2018-0115337

(51) Int. Cl.
*G01N 3/02* (2006.01)
*G01N 3/08* (2006.01)

(52) U.S. Cl.
CPC ................ *G01N 3/02* (2013.01); *G01N 3/08* (2013.01); *G01N 2203/0017* (2013.01);
(Continued)

(58) Field of Classification Search
CPC ... G01N 2203/0017; G01N 2203/0019; G01N 2203/0062; G01N 2203/0064;
(Continued)

(56) References Cited

U.S. PATENT DOCUMENTS 3,715,916 A * 2/1973 Stickney .................. G01N 3/04
73/859
3,795,134 A   3/1974 Eichenbrenner et al.
(Continued)

FOREIGN PATENT DOCUMENTS

JP    2004279083 A *  10/2004
JP    2006242645 A *  9/2006
(Continued)

OTHER PUBLICATIONS

International Search Report for PCT/KR2019/011682 dated Dec. 17, 2019 from Korean Intellectual Property Office.

*Primary Examiner* — Andre J Allen
(74) *Attorney, Agent, or Firm* — Paratus Law Group, PLLC

(57) ABSTRACT

Disclosed is an anti-buckling jig of a fracture toughness test. The anti-buckling jig includes: a first jig unit provided in a form of surrounding one side surface of a specimen; a second jig unit provided in a form of surrounding the other side surface of the specimen; and a screw provided to allow the first jig unit and the second jig unit to be coupled to each other. During the fracture toughness test of the specimen, the first jig unit and the second jig unit simultaneously support both sides of the specimen, so that the specimen is cracked in a single direction.

4 Claims, 5 Drawing Sheets

(52) U.S. Cl.
CPC ............... *G01N 2203/0019* (2013.01); *G01N 2203/0064* (2013.01); *G01N 2203/0067* (2013.01); *G01N 2203/0423* (2013.01)

(58) Field of Classification Search
CPC ... G01N 2203/0066; G01N 2203/0067; G01N 2203/027; G01N 2203/0423; G01N 3/02; G01N 3/04; G01N 3/08
See application file for complete search history.

(56) References Cited

U.S. PATENT DOCUMENTS

| | | | | |
|---|---|---|---|---|
| 5,297,441 | A | * | 3/1994 | Smith ..................... G01N 3/04 73/818 |
| 9,513,200 | B1 | * | 12/2016 | Dubke ..................... G01N 3/20 |

FOREIGN PATENT DOCUMENTS

| | | | | |
|---|---|---|---|---|
| JP | 2021162585 | A | * | 10/2021 |
| KR | 10-0035719 | B1 | | 6/1990 |
| KR | 10-2006-0089295 | A | | 8/2006 |
| KR | 20120045198 | A | * | 5/2012 |
| KR | 10-2013-0124690 | A | | 11/2013 |
| KR | 10-2015-0030282 | A | | 3/2015 |
| KR | 10-1811619 | B1 | | 12/2017 |
| KR | 20210063809 | A | * | 6/2021 |

* cited by examiner

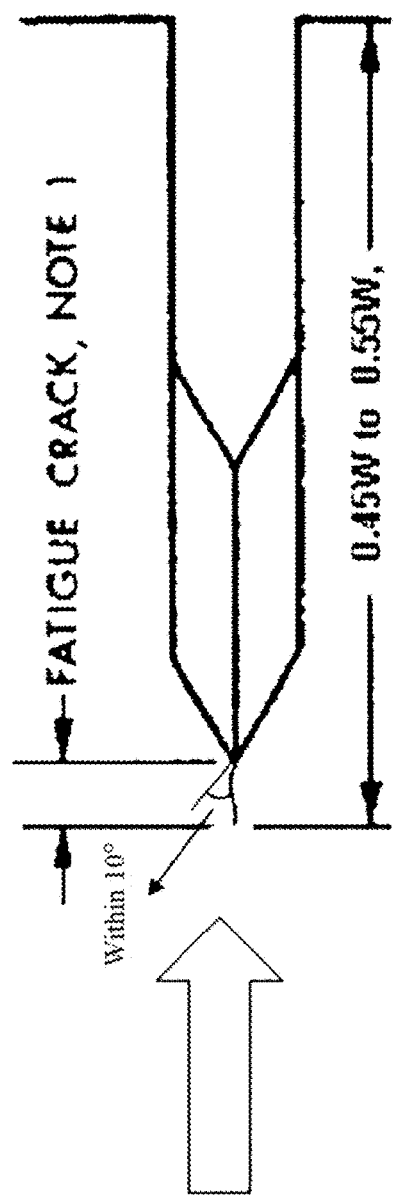
FIG. 9
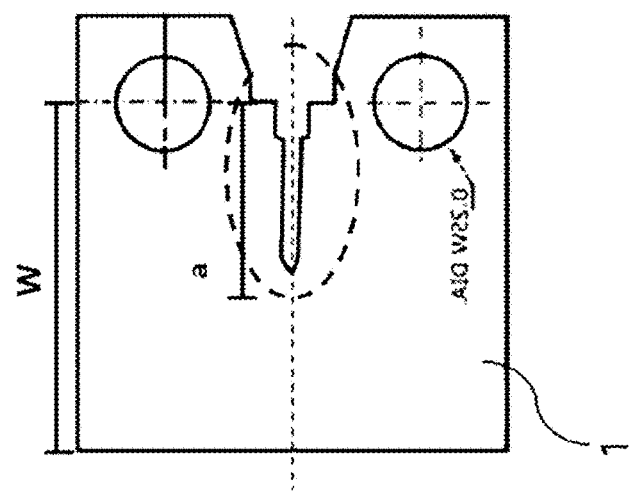

ANTI-BUCKLING JIG FOR FRACTURE TOUGHNESS TEST

CROSS-REFERENCE TO PRIOR APPLICATIONS

This application is a National Stage Patent Application of PCT International Patent Application No. PCT/KR2019/011682 (filed on Sep. 10, 2019) under 35 U.S.C. § 371, which claims priority to Korean Patent Application No. 10-2018-0115337 (filed on Sep. 27, 2018), which are all hereby incorporated by reference in their entirety.

BACKGROUND

The present invention relates to an anti-buckling jig of a fracture toughness test, and more specifically, to an anti-buckling jig of a fracture toughness test to observe the occurrence of the crack in a specimen with the naked eye while preventing buckling from occurring in the specimen by using a jig formed to surround an outer circumferential surface of the specimen.

Fracture toughness as a fracture mechanism factor is a material-specific property that represents a degree of resistance that a specimen may withstand external loads. Accurate measurement of the physical property is very important for product structure analysis.

In order to measure the fracture toughness of the material, a stress is applied to the specimen having a certain size of crack of to cause fracture, and then the fracture stress is obtained. The fracture toughness of the material is a concept introduced because an actual strength is weaker than a theoretical strength of the material in terms of the fracture mechanics of the material.

However, in a test in which a tensile test and a compression test are repeated using a thin steel plate, since the thickness of the specimen is very thin, buckling easily occurs to cause an error in the measured value.

In Korean Patent Publication No. 10-0035719 for solving the above problems, a pair of anti-buckling jigs are provided that are positioned on one side and the other side of the specimen, respectively, to prevent buckling of the specimen when the specimen is compressed. The jig is to prevent the occurrence of buckling in the specimen. However, there is a problem in that the appearance of the crack growth cannot be visually observed in order to check a developing situation of the crack and a propagation angle of the crack during the test.

SUMMARY

Accordingly, the present invention is to be derived to solve the problems of the related art as described above, and an object of the present invention is to prevent buckling from occurring in a specimen during a test.

Another object of the present invention is to visually check a developing situation of a crack and a propagation angle of the crack during a test.

Objects to be solved by the present invention are not limited to the aforementioned objects and other unmentioned objects to be solved by the present invention will be clearly understood by those skilled in the art from the following description.

According to a preferred embodiment of the present invention, there is provided an anti-buckling jig of a fracture toughness test including: a first jig unit provided in a form of surrounding one side surface of a specimen; a second jig unit provided in a form of surrounding the other side surface of the specimen; and a screw provided to allow the first jig unit and the second jig unit to be coupled to each other, wherein during the fracture toughness test of the specimen, the first jig unit and the second jig unit simultaneously support both sides of the specimen, so that the specimen is cracked in a single direction.

Further, the anti-buckling jig of the fracture toughness test may further include a friction reduction member provided between the first jig unit and the second jig unit to reduce a frictional force subjected to the specimen.

Further, the first jig unit and the second jig unit may include observation grooves provided to visually observe the generation of the crack in the specimen during the fracture toughness test of the specimen.

Further, the first jig unit and the second jig unit may include coupling grooves provided to couple the specimen and a testing device to each other during the fracture toughness test of the specimen.

Further, the first jig unit and the second jig unit may include a plurality of screw grooves provided at corners of the first jig unit and the second jig unit to be coupled to each other through the screw with the specimen interposed therebetween.

By means of solving the above problems, an anti-buckling jig of a fracture toughness test of the present invention has an effect of preventing buckling from occurring in a specimen during a test.

Further, the anti-buckling jig of the fracture toughness test of the present invention has an effect of visually checking a developing situation of a crack and a propagation angle of the crack during a test.

BRIEF DESCRIPTION OF THE DRAWINGS

FIG. 9 is an enlarged diagram of an appearance of a crack line of an anti-buckling jig of a fracture toughness test according to an embodiment of the present invention.

DETAILED DESCRIPTION

Terms used in the present specification will be described in brief and the present invention will be described in detail.

Terms used in the present invention adopt general terms which are currently widely used as possible by considering functions in the present invention, but the terms may be changed depending on an intention of those skilled in the art, a precedent, emergence of new technology, etc. Accordingly, a term used in the present invention should be defined based on not just a name of the term but a meaning of the term and contents throughout the present invention.

Further, throughout the specification, unless explicitly described to the contrary, the word "comprise" and variations such as "comprises" or "comprising", will be understood to imply the inclusion of stated elements but not the exclusion of any other elements.

An embodiment of the present invention will be described more fully hereinafter with reference to the accompanying drawings so as to be easily implemented by those skilled in the art. However, the present invention may be implemented in various different forms and is not limited to the embodiments described herein.

Specific matters including problems to be solved for the present invention, solutions of the problems, and the effects of the invention for the present invention are included in exemplary embodiments and drawings to be described below. Advantages and features of the present invention, and methods for accomplishing the same will be more clearly understood from embodiments to be described below in detail with reference to the accompanying drawings.

Hereinafter, the present invention will be described in more detail with reference to the accompanying drawings.

Figure 1:
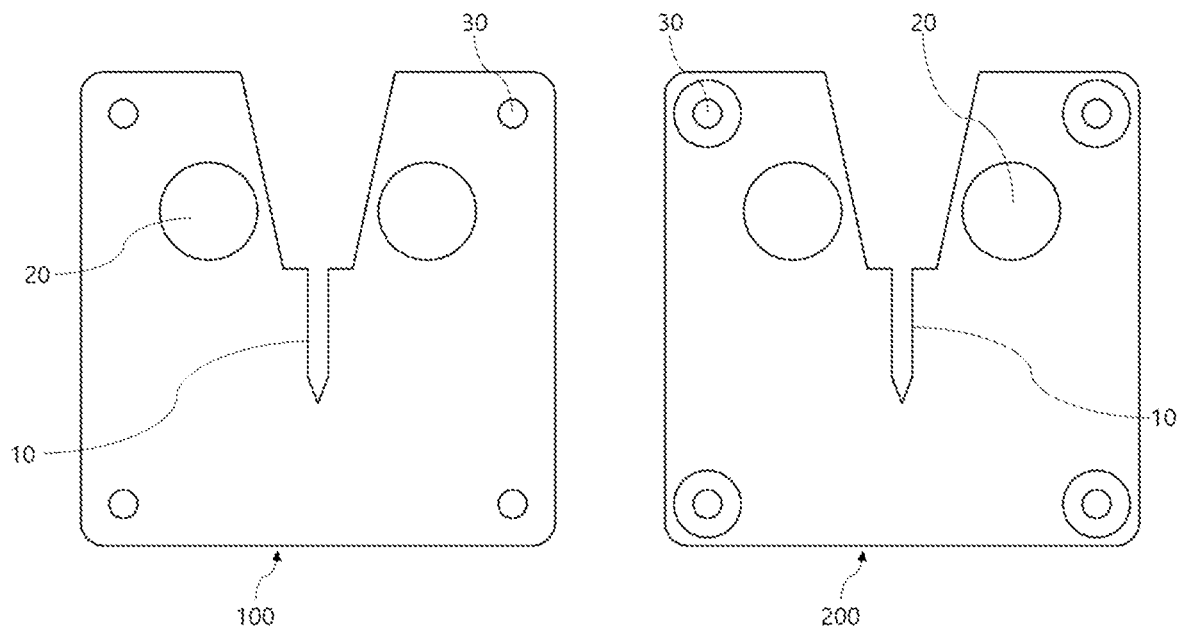
FIG. 1 illustrates a block diagram of an anti-buckling jig of a fracture toughness test according to an embodiment of the present invention.
Figure 2:
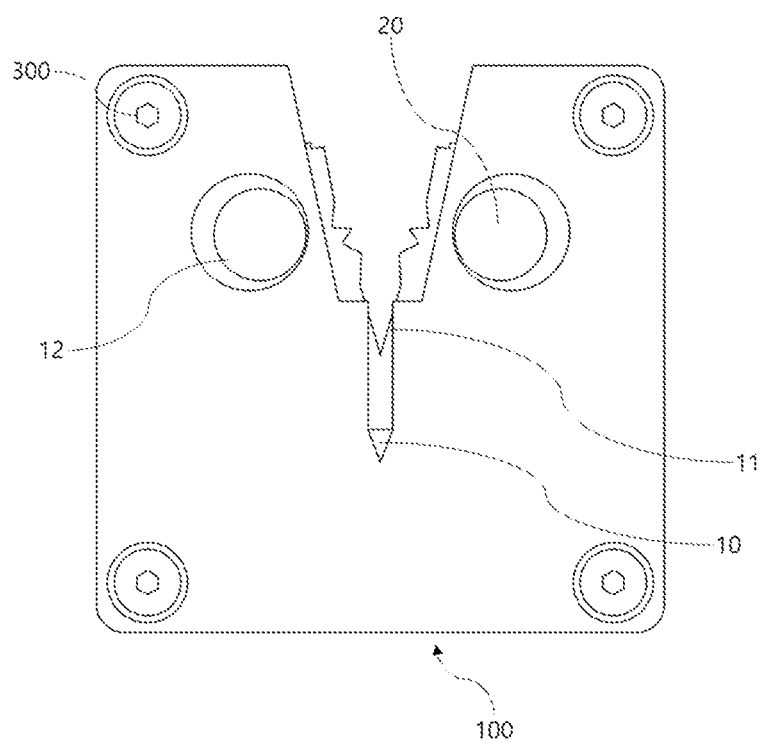
FIG. 2 illustrates a block diagram of an anti-buckling jig of a fracture toughness test according to an embodiment of the present invention.
Figure 3:
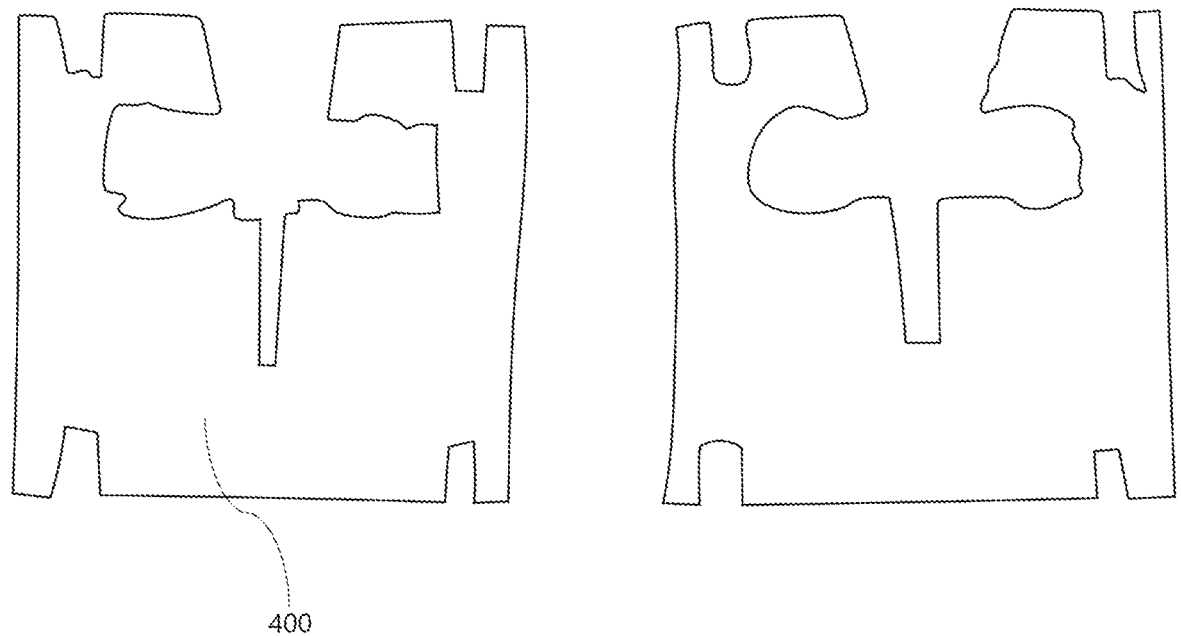
FIG. 3 illustrates a block diagram of an anti-buckling jig of a fracture toughness test according to an embodiment of the present invention.

Referring to FIGS. 1 to 3, an anti-buckling jig of a fracture toughness test according to a preferred embodiment of the present invention includes a first jig unit 100 provided in a form of surrounding one side of a specimen 1, a second jig unit 200 provided in a form of surrounding the other side of the specimen 1, and a screw 300 provided to allow the first jig unit 100 and the second jig unit 200 to be coupled to each other. During the fracture toughness test of the specimen 1, the first jig unit 100 and the second jig unit 200 simultaneously support both sides of the specimen 1 so that the specimen 1 is cracked in a single direction. That is, the first jig unit 100 and the second jig unit 200 are provided on both sides with the specimen 1 interposed therebetween to support the specimen 1.

More specifically, the fracture toughness test is a test for measuring the fracture resistance of the specimen 1 by applying a repeated load or a tensile force to the specimen 1. Accordingly, referring to FIG. 2, the specimen 1 is fixed to a testing device 2, and the repeated load is applied vertically with respect to the specimen 1 to observe an appearance of the crack growing in the specimen 1. In the above process, when the specimen 1 is an object made of a thin member, when the specimen 1 receives a stress from the outside, buckling that causes a sudden transverse deformation occurs. That is, in the fracture toughness test, when the specimen 1 is thin, a buckling phenomenon occurs in which a multiaxial stress is generated so that the specimen 1 is deformed even with a small force applied in a direction of the thickness of the specimen 1. When the buckling phenomenon occurs, the specimen 1 is deformed regardless of the growth of the crack in the specimen 1, so that an accurate test cannot be performed. Accordingly, during the fracture toughness test of the specimen 1, the first jig unit 100 and the second jig unit 200 are positioned at both sides of the specimen 1, respectively, to simultaneously support the both sides of the specimen 1, thereby preventing buckling from occurring in the specimen 1.

Next, the anti-buckling jig further includes a friction reduction member 400 provided between the first jig unit 100 and the second jig unit 200 to reduce a frictional force subjected to the specimen 1. That is, the friction reduction member 400 is positioned on both sides of the specimen 1 to reduce the frictional force generated between the specimen 1 and the first jig unit 100 and the second jig unit 200. The friction reduction member 400 is provided in the same shape as the cross sections of the first jig unit 100 and the second jig unit 200, and it is preferred that the thickness of the friction reduction member 400 is formed to be thinner than the first jig unit 100 and the second jig unit 200. Therefore, it is preferable that the friction reduction member 400 is formed of a Teflon tape.

Next, the first jig unit 100 and the second jig unit 200 include observation grooves 10 provided to visually observe the generation of the crack in the specimen 1 during the fracture toughness test of the specimen 1. The observation grooves 10 are positioned at the centers of the first jig unit 100 and the second jig unit 200. In more detail, the observation groove 10 is formed to extend from one side of the first jig unit 100 and the second jig unit 200 to one side of a lower end thereof through the central portion of the first jig unit 100 and the second jig unit 200. Further, the observation grooves 10 are formed to extend obliquely up to the central portions of the first jig unit 100 and the second jig unit 200 and then extend straightly from the central portions of the first jig unit 100 and the second jig unit 200. Therefore, during the fracture toughness test of the specimen 1, it is possible to observe a growing process of the crack generated in the specimen 1. In other words, during the fracture toughness test of the specimen 1, a situation in which the crack generated in the specimen 1 is developed and a propagation angle of the crack may be visually checked. In addition, it is preferable that the observation groove 10 is formed to be wider than a specimen crack groove 11 formed by extending from the central portion to one side of the specimen 1. That is, during the fracture toughness test of the specimen 1, the observation groove 10 is formed to be deeper than the specimen crack groove 11 so that a growing process of the crack generated from the specimen crack groove 11 can be seen.

Next, the first jig unit 100 and the second jig unit 200 include coupling grooves 20 provided to couple the first jig unit 100 and the second jig unit 200 to each other during the fracture toughness test of the specimen 1. That is, referring to FIG. 2, the specimen 1 and the testing device 2 are coupled to each other by two specimen coupling grooves 12 provided on one side of the specimen 1. Therefore, it is preferable that the coupling groove 20 forms a concentric circle with the specimen coupling groove 12 and has a larger diameter than the specimen coupling groove 12. That is, the coupling groove 20 allows the specimen 1 to be coupled to the testing device 2 while the specimen 1 is provided between the first jig unit 100 and the second jig unit 200. Accordingly, two coupling grooves 20 are provided on the first jig unit 100 and the second jig unit 200 symmetrically based on the center, respectively. In addition, when the testing device 2 repeatedly applies a tensile force and a compressive force to the specimen 1, the coupling groove 20 is formed so that the tensile force and the compressive force are not transmitted to the first jig unit 100 and the second jig unit 200. That is, when the tensile force and the compressive force are applied to the specimen 1 while the testing device 2 is elevated, the diameter of the coupling groove 20 is longer than the elevating length of the testing device 2. Therefore, the first jig unit 100 and the second jig unit 200 do not receive directly a force by the testing device 2, and allow the specimen 1 to receive a force in a single direction.

Next, the first jig unit 100 and the second jig unit 200 include a plurality of screw grooves 30 provided at corners of the first jig unit 100 and the second jig unit 200 to be coupled to each other through the screw 300 with the specimen 1 interposed therebetween. That is, referring to FIG. 3, the screw groove 30 is provided at each corner of the first jig unit 100 and the second jig unit 200. In more detail, the first jig unit 100 and the second jig unit 200 are each provided with four screw grooves 30. Accordingly, during the fracture toughness test of the specimen 1, the first jig unit 100 and the second jig unit 200 are positioned at both sides of the specimen 1, respectively, to be coupled to each other by the screw 300 through the screw grooves 30 and support the both sides of the specimen 1, thereby preventing a buckling phenomenon from occurring in the specimen 1.

Next, a test method and a test condition of the fracture toughness test will be described in detail. The fracture toughness test is subjected to a pre-cracking process that artificially generates a crack in the specimen 1 before the test. In other words, the fracture toughness test is a test of measuring the fracture resistance of a material with cracks.

Figure 4:
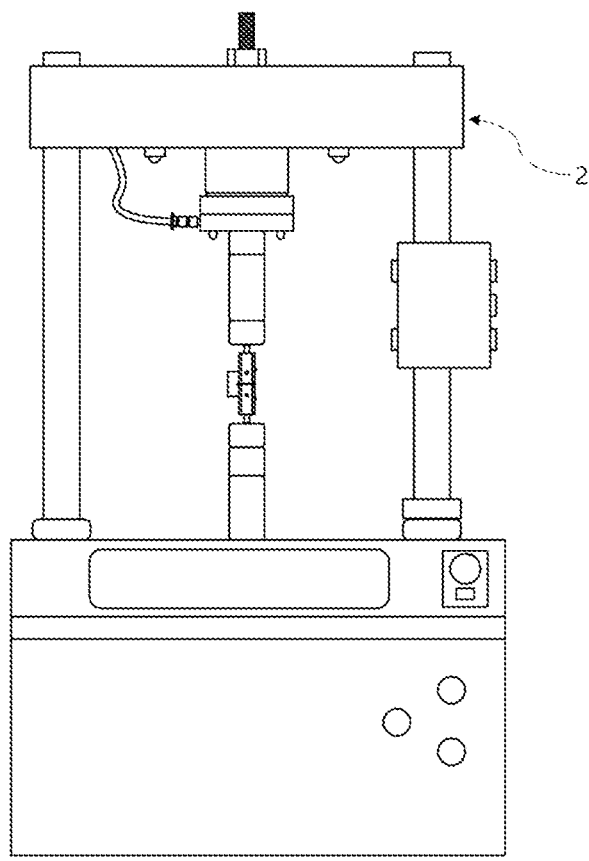
FIG. 4 illustrates a testing device of an anti-buckling jig of a fracture toughness test according to an embodiment of the present invention.
Figure 5:
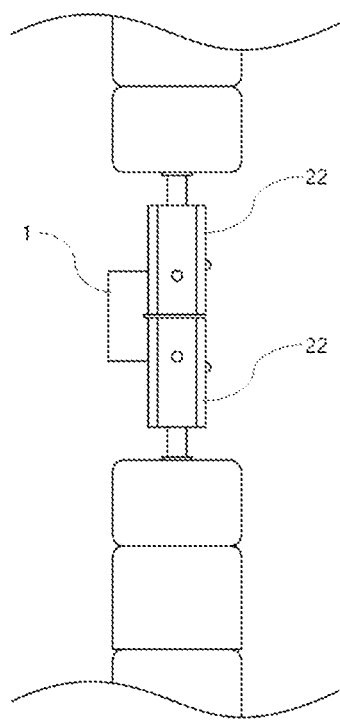
FIG. 5 illustrates a testing device of an anti-buckling jig of a fracture toughness test according to an embodiment of the present invention.
Figure 6:
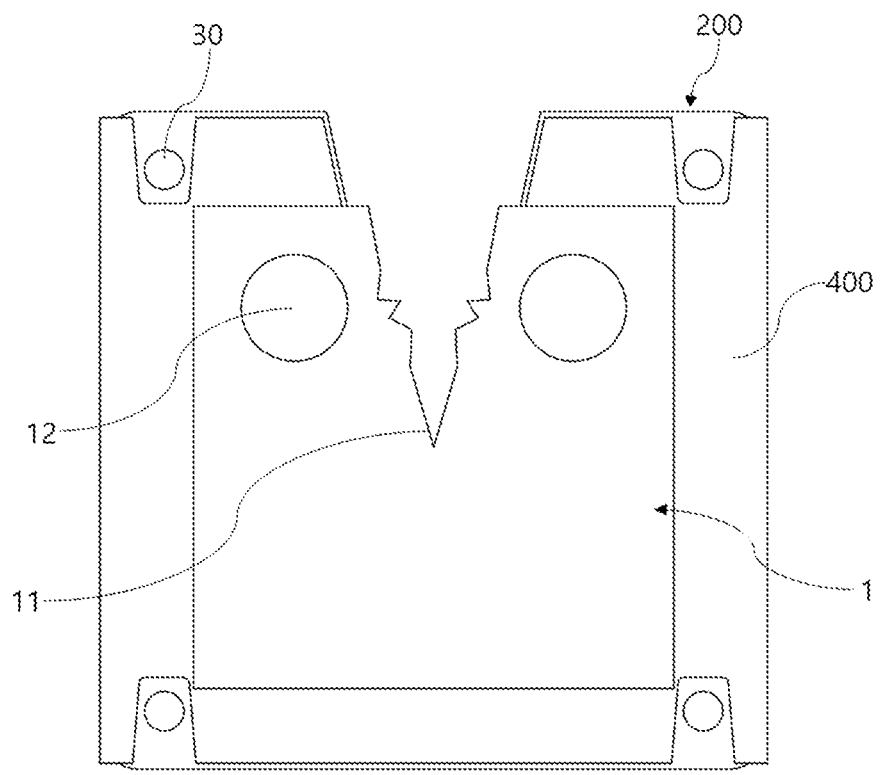
FIG. 6 illustrates an assembly order of an anti-buckling jig of a fracture toughness test according to an embodiment of the present invention.
Figure 7:
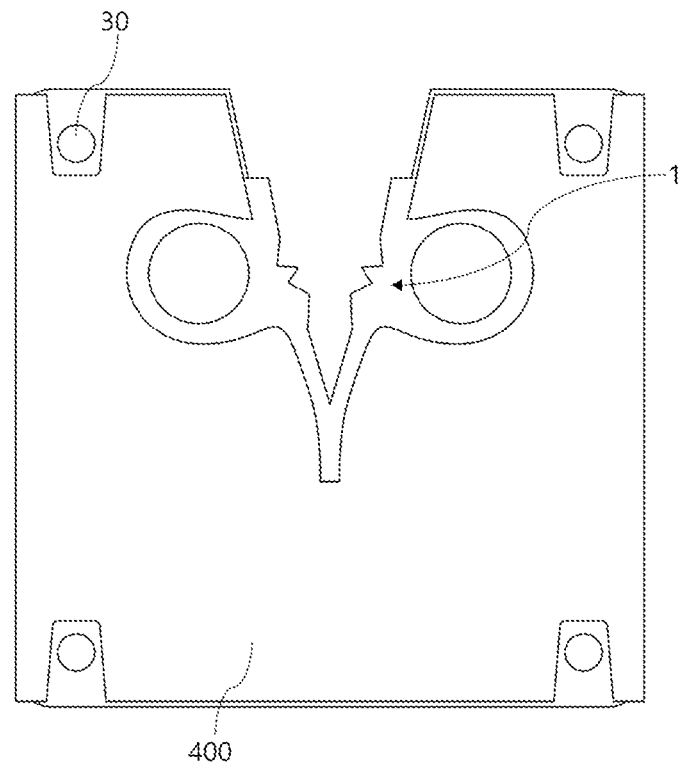
FIG. 7 illustrates an assembly order of an anti-buckling jig of a fracture toughness test according to an embodiment of the present invention.
Figure 8:
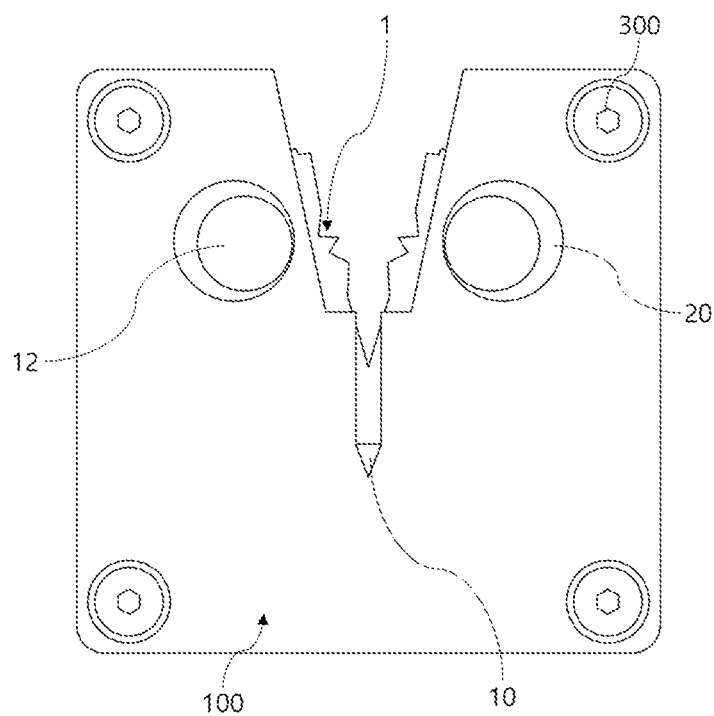
FIG. 8 illustrates an assembly order of an anti-buckling jig of a fracture toughness test according to an embodiment of the present invention.

Next, referring to FIG. 4, W represents a straight line length from the center of the specimen coupling groove 12 to the edge of the specimen 1 positioned at the farthest distance from the center of the specimen coupling groove 12. Here, a represents a length from the center of the specimen coupling groove 12 to the end of the specimen crack groove 11. Finally, B represents a thickness of the specimen 1. In the fracture toughness test, the specimen 1 needs to be manufactured according to a condition of B=0.5 W in a thin plate specimen 1 having a thickness of 3 mm or less according to ASTM E1820 standards. In addition, a size of the crack generated by the pre-cracking needs to be generated in the range of 0.45 W to 0.55 W, and the crack needs to be generated within 2.5% of the total a. In addition, an angle of the crack needs to be generated within 100 based on the central portion of the specimen 1.

Accordingly, widths of the first jig unit 100 and the second jig unit 200 are provided 1.1 to 1.7 times the width of the specimen 1, respectively. At this time, if the widths of the first jig unit 100 and the second jig unit 200 are less than 1.1 times the width of the specimen 1, respectively, there is a problem in that it is not easy to couple the first jig unit 100 and the second jig unit 200 to each other while the specimen 1 is provided between the first jig unit 100 and the second jig unit 200. In addition, if the widths of the first jig unit 100 and the second jig unit 200 exceed 1.7 times the width of the specimen 1, respectively, when the first jig unit 100 and the second jig unit 200 are coupled to each other while the specimen 1 is provided between the first jig unit 100 and the second jig unit 200, there is a problem that the specimen 1 is not completely fixed, and when the specimen 1 is coupled to a jig 22, there is a problem that the first jig unit 100 and the second jig unit 200 are interfered with the jig 22. Accordingly, it is preferred that the widths of the first jig unit 100 and the second jig unit 200 are provided 1.1 to 1.7 times the width of the specimen 1, respectively.

Next, the length of the observation groove 10 is manufactured to be 1.0 to 1.3 times the length of the specimen crack groove 11. At this time, if the length of the observation groove 10 is less than 1.0 times the length of the specimen crack groove 11, during the fracture toughness test of the specimen 1, there is a problem that the crack of the specimen 1 cannot be easily observed visually. In addition, when the length of the observation groove 10 is more than 1.3 times the length of the specimen crack groove 11, there is a problem that the rigidity of the first jig unit 100 and the second jig unit 200 is weakened so that the buckling cannot be prevented. Accordingly, it is preferred that the length of the observation groove 10 is manufactured to be 1.0 to 1.3 times the length of the specimen crack groove 11.

Next, the diameter of the coupling groove 20 is manufactured to be 1.2 to 1.4 times the diameter of the specimen coupling groove 12. When the diameter of the coupling groove 20 is less than 1.2 times the diameter of the specimen coupling groove 12, there is a problem that the first jig unit 100 and the second jig unit 200 do not directly receive a force by the testing device 2 to reduce the accuracy of the test. In addition, there is a problem that the force to be applied to the specimen 1 during the fracture toughness test is transmitted to the first jig unit 100 and the second jig unit 200 so that the first jig unit 100 and the second jig unit 200 may be broken. In addition, when the diameter of the coupling groove 20 is more than 1.4 times the diameter of the specimen coupling groove 12, there is a problem that the rigidity of the first jig unit 100 and the second jig unit 200 is weakened. Accordingly, it is preferred that the diameter of the coupling groove 20 is manufactured to be 1.2 to 1.4 times the diameter of the specimen coupling groove 12.

Hereinafter, the operation of the anti-buckling jig of the fracture toughness test in the present invention will be described in detail.

First, the specimen 1 is prepared. It is preferred that the specimen 1 includes the specimen crack groove 11 formed by extending from one side of the specimen 1 to the central portion of the specimen 1. Next, referring to FIG. 3, the first jig unit 100 is positioned on one side of the specimen 1, and the friction reduction member 400 is positioned between the specimen 1 and the first jig unit 100. Next, the second jig unit 200 is positioned on the other side of the specimen 1, and the friction reduction member 400 is positioned between the specimen 1 and the second jig unit 200. Next, the first jig unit 100 and the second jig unit 200 are coupled to each other with the screw 300 using the screw grooves 30. That is, during the fracture toughness test of the specimen 1, the first jig unit 100 and the second jig unit 200 are positioned at both sides of the specimen 1, respectively, to simultaneously support the both sides of the specimen 1, thereby preventing a buckling phenomenon from occurring in the specimen 1. Next, the specimen 1 and the testing device 2 are coupled to each other using the coupling groove 20. Next, while performing the test of the specimen 1, the development of the crack in the specimen 1 is visually observed through the observation groove 10. At this time, the specimen 1 is cracked in a single direction due to the first jig unit 100 and the second jig unit 200.

As described above, those skilled in the art will be able to understand that a technical configuration of the present invention can be easily executed in other detailed forms without changing the technical spirit or an essential feature thereof.

Therefore, the embodiments described above are illustrative in all aspects and should be understood as not being restrictive, and the scope of the present invention is represented by claims to be described below rather than the detailed description, and it is to be interpreted that the meaning and scope of the appended claims and all changes or modifications derived from the equivalents thereof come within the scope of the present invention.

The invention claimed is:

1. An anti-buckling jig of a fracture toughness test comprising:

a first jig unit provided in a form of surrounding one side of a specimen;

a second jig unit provided in a form of surrounding the other side of the specimen; and a screw provided to allow the first jig unit and the second jig unit to be coupled to each other, wherein during the fracture toughness test of the specimen, the first jig unit and the second jig unit simultaneously support both sides of the specimen so that the specimen is cracked in a single direction, and wherein the first jig unit and the second jig unit include observation grooves provided to visually observe the generation of the crack in the specimen during the fracture toughness test of the specimen.

2. The anti-buckling jig of the fracture toughness test of claim 1, further comprising:

a friction reduction member provided between the first jig unit and the second jig unit to reduce a frictional force subjected to the specimen.

3. The anti-buckling jig of the fracture toughness test of claim 1, wherein the first jig unit and the second jig unit include coupling grooves provided to couple the specimen and a testing device to each other during the fracture toughness test of the specimen.

4. An anti-buckling jig of a fracture toughness test comprising:

a first jig unit provided in a form of surrounding one side of a specimen;

a second jig unit provided in a form of surrounding the other side of the specimen; and a screw provided to allow the first jig unit and the second jig unit to be coupled to each other, wherein during the fracture toughness test of the specimen, the first jig unit and the second jig unit simultaneously support both sides of the specimen so that the specimen is cracked in a single direction, and wherein the first jig unit and the second jig unit include a plurality of screw grooves provided at corners of the first jig unit and the second jig unit to be coupled to each other through the screw with the specimen interposed therebetween.

* * * * *